June 11, 1963
M. L. RAMME
3,093,219
PLURAL-SECTION AIRFOILS
Filed April 6, 1961
2 Sheets-Sheet 1
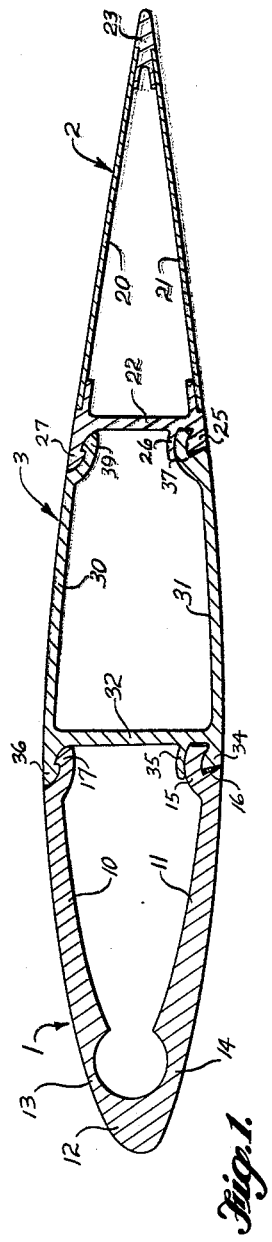
INVENTOR.
MAURICE L. RAMME
BY
Robert W. Beach
ATTORNEY

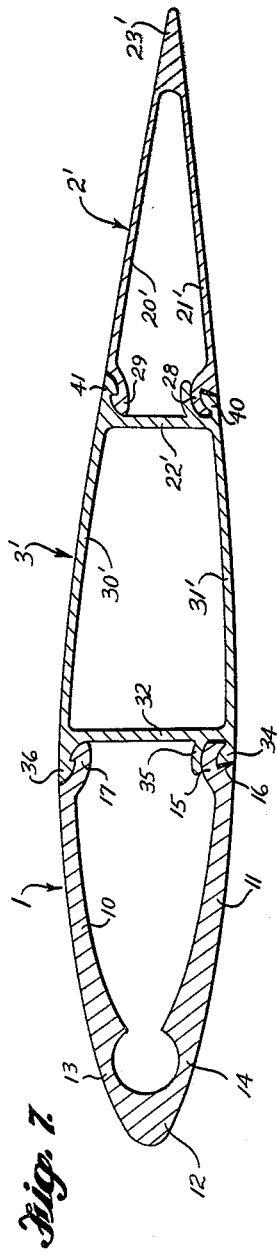
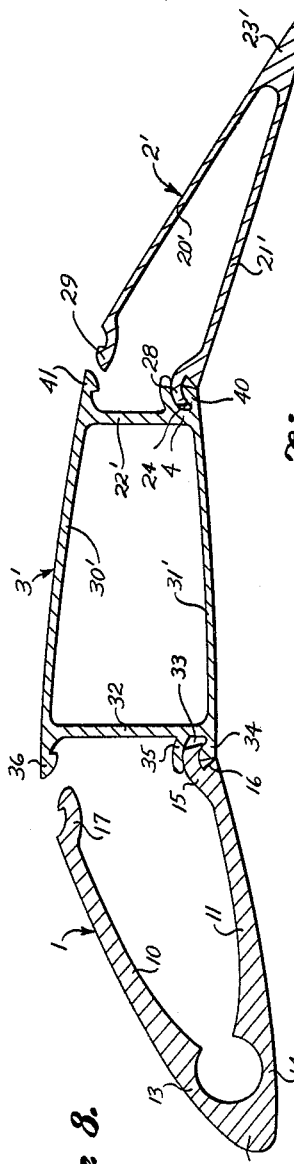
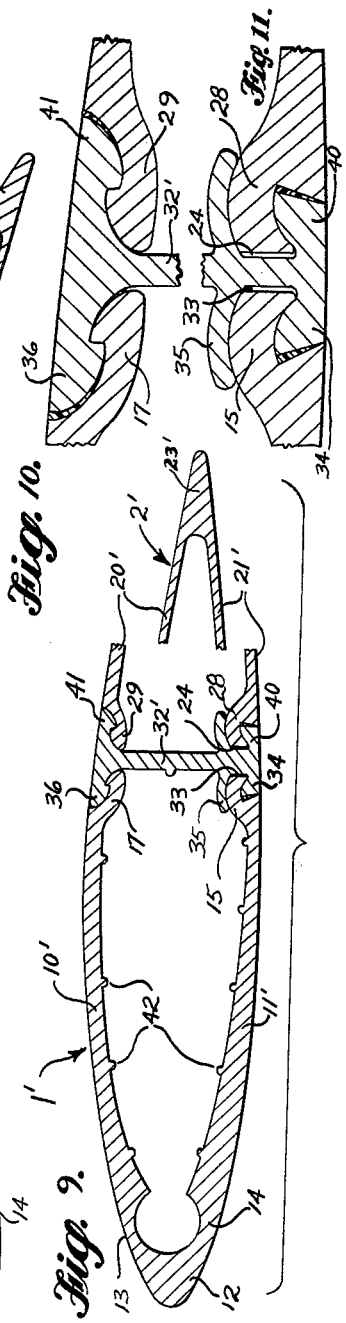

United States Patent Office 3,093,219
Patented June 11, 1963

3,093,219
PLURAL-SECTION AIRFOILS
Maurice L. Ramme, Seattle, Wash., assignor to Monte-Copter, Inc., Seattle, Wash., a corporation of Washington
Filed Apr. 6, 1961, Ser. No. 101,156
12 Claims. (Cl. 189—34)

This invention relates to an airfoil composed of a plurality of sections extending spanwise, which are assembled to form an airfoil of full chord, which is particularly applicable for use as a rotary wing.

A principal object is to provide an airfoil particularly useful as a rotary wing, which can be constructed in sections of indeterminate length spanwise, capable of being assembled quickly and easily.

It is an object for such an airfoil structure to be light and strong, and composed of parts which can be assembled readily, and will be held together securely. It is preferred that the parts be thus engaged by snap action without requiring to be secured in assembled relation by separately actuated fasteners.

A further object is to provide such an airfoil construction composed of a minimum number of extruded parts, each of which is inherently a structural portion of the airfoil.

It is also an object to provide such an airfoil construction the parts of which can be demounted with ease prior to final assembly but which will be bonded together when finally assembled.

More specifically it is an object to provide an airfoil composed of sections capable of being assembled in such a way that aerodynamic forces to which the airfoil normally is subjected will tend to maintain such airfoil sections in their assembled relationship to avoid inadvertent disengagement of such sections.

The foregoing objects can be attained by utilizing an airfoil construction composed of at least two, and preferably three, airfoil sections of indeterminate length spanwise of the airfoil, which can be assembled in edge-to-edge relationship to form the complete airfoil chord. These sections include a leading edge section, a trailing edge section, and preferably at least one central section. These sections are interconnected by engaging spaced, flexibly connected flanges of one section with rigidly spaced elements of the adjacent section, so that the resiliently spaced flanges can yield to engage with the rigidly spaced elements of the adjacent section. The connections between adjacent sections are of interengaging hook character. Each section is composed of upper and lower airfoil surface components and a connecting component integral with and spacing apart such surface components. Such airfoil sections are preferably assembled by relative swinging movement to effect snap engagement of cooperating latching members.

FIGURE 1 is a chordal section through an assembled airfoil of preferred construction, and FIGURE 2 is a chordal section showing parts in the process of being assembled.

FIGURE 3 is an enlarged chordal section through an upper forward joint portion of the airfoil; FIGURE 4 is an enlarged chordal section through a lower forward joint portion; FIGURE 5 is a chordal section through an upper rearward joint portion; and FIGURE 6 is an enlarged chordal section through a lower rearward joint portion.

FIGURE 7 is a chordal section through a modified type of airfoil, and FIGURE 8 is a chordal section through such airfoil showing parts in the process of being assembled.

FIGURE 9 is a chordal section through a different airfoil structure with parts broken away; FIGURE 10 is an enlarged chordal section through the upper central joint portion; and FIGURE 11 is a chordal section through the lower central joint portion.

The airfoil of the present invention is composed at least of a leading edge section 1 and a trailing edge section 2 extending spanwise of the airfoil which are connected together. In the form of airfoil shown in FIGURE 1 such leading edge section and trailing edge section are connected by an intermediate section 3. The direct connection between the rearward portion of the leading edge section and the forward portion of the intermediate section, shown in FIGURE 1, is virtually the same as the direct connection between the rearward portion of the intermediate section and the forward portion of the trailing edge section. The joint in each case includes a lower joint portion adjacent to the lower surface of the airfoil and an upper joint portion spaced from the lower joint portion and adjacent to the upper surface of the airfoil. The spacing of the joint elements on one airfoil section should be variable, and the spacing of the cooperating elements on the other air foil section preferably should be fixed, so that the cooperating joint elements can be connected by snap engagement.

As mentioned above, it is preferred that the same type of joint be used to connect the rearward portion of the leading edge section 1 with the forward portion of the intermediate section 3, and the rearward portion of the intermediate section with the forward portion of the trailing edge section 2. In each instance the spacing between the rearward upper and lower joint elements is variable, whereas the spacing between the forward upper and lower joint elements is fixed. Such variation in spacing is made possible by the rearward joint elements in each instance being carried by long flanges of the airfoil sections. The leading edge section 1 is of deep channel shape defining spaced wide resilient upper flange 10 and lower flange 11, which are connected by the leading edge portion 12. Such flanges form respectively the upper and lower surfaces of the airfoil section, and the thickness of the root portions 13 and 14 of these flanges can be selected so as to provide the desired degree of resilience and enable the spacing of the flanges to be varied appropriately.

Similarly the central or intermediate airfoil section 3 is of deep channel shape defining spaced wide resilient upper flange 30 and lower flange 31, forming upper and lower portions of the airfoil surface and having their forward portions connected together by a spar 32 integral with them. The rear free edge portion of each of these flanges carries a joint element which is of a width a minor portion of the width of the flanges chordwise of the airfoil to be connected to complemental joint elements on the forward portion of the trailing edge wing section 2. Such trailing edge wing section includes an upper surface portion or skin 20 and a lower surface portion or skin 21, the forward portions of which are connected by the rear spar 22, and the rearward portions of which are connected by the trailing edge member 23.

The nature of the particular joint elements is shown best in the enlarged views of FIGURES 3, 4, 5 and 6. Each of such joints preferably includes one pair of elements which can be engaged in interlocked position by relative swinging movement and a second pair of elements which can be engaged in locking relationship by a snap action. In the construction illustrated it is the lower portion of each joint which is shown as composed of the joint elements which can be locked by relative swinging movement, and the upper joint portion which is composed of the pair of joint elements capable of being resiliently self-interlocked by snap action. The relative swinging movement of adjacent airfoil sections required to effect interlocking of the lower joint elements is that requiring an upward movement of one section or the other, or both, with respect to the joint. Consequently the positive pressure upward produced on the lower surface of the airfoil by aerodynamic forces resulting from movement of the relative wind over the airfoil serves to urge the airfoil sections in a direction tending to maintain the joint elements in interlocked relationship.

The specific joints illustrated include a tongue 15 on the rearward portion of the lower flange 11 of the leading edge airfoil section 1. Preferably this tongue extends continuously spanwise along the flange 11, although it could be interrupted. This tongue is spaced inward from the lower surface to form the shoulder 16 between it and such surface. Such tongue has a concave lower surface and a convex upper surface. The tongue element 15 fits into a groove 33 at the lower forward portion of the intermediate wing section 3. This groove is formed between an outer rib 34 in forward extension of the flange 31 and an inner rib 35 projecting forward from the spar 32. The lower surface of such groove is convex, and the upper surface is concave, complemental to the lower and upper surfaces, respectively, of the tongue 15.

The tongue joint element 15 projecting rearwardly from the leading edge airfoil section 1 can be engaged in the forwardly opening groove 33 in the forward portion of the intermediate airfoil section 3 when the lower surfaces of such sections form an obtuse angle, as indicated in FIGURE 2. Such joint elements are moved into the interlocking engagement relationship shown in FIGURES 1 and 4 by relative movement of the airfoil sections to increase the angle between them until the lower surfaces of such airfoil sections pass beyond a straight angle into the position shown in FIGURE 1, in which they form the somewhat convex lower surface of the airfoil.

In order to employ the type of airfoil section connecting joint shown in FIGURES 1 to 4 inclusive, it is not necessary that the lower surface of the airfoil be convex, but it can be planar or even concave, if desired. The important consideration is that the interngaged tongue and groove joint elements adjacent to the lower surface of the airfoil be capable of being swung relatively sufficiently to effect interengagement of the joint elements adjacent to the upper surface of the airfoil, at which time the desired contour of the lower surface of the airfoil will have been achieved. The joint elements remote from the tongue and groove elements, which are also engaged by such relative swinging of the airfoil sections, are preferably resiliently self-interlocked automatically by such movement with a snap engagement. As shown best in FIGURE 3, such joint elements are interengageable hooked flanges, including the inwardly facing hook 36 projecting forwardly from the upper edge of the intermediate section 3, and the hook 17 projecting rearwardly and carried by the rearward edge portion of the upper flange 10 of the leading edge airfoil section 1.

The hook 36 faces inwardly or downwardly, and the hook 17 faces upwardly or outwardly. Moreover, the hook 36 is set forward of the intermediate section spar 32 a distance sufficient to receive the hook 17 between such spar and the hook 36. Hook 36 is, however, located sufficiently close to the spar so that it cannot move appreciably transversely of the airfoil, but rather is disposed in fixed relationship to the groove 33. The hook 17 is spaced inwardly from the exterior surface of flange 10 sufficiently so that when it is engaged beneath and behind hook 36 the exterior surface of flange 10 will be flush with the exterior surface of the flange of airfoil section 3 forming the hook 36.

In relaxed condition of section 1 it is preferred that the flanges 10 and 11 be spread so that the trailing portions of their outer surfaces are spaced apart slightly in excess of the spacing of the outer surfaces at the forward portion of the next rearward airfoil section. As the sections to be interengaged are swung relatively, therefore, to move the tongue 15 into the groove 33, the upper surface of hook 17 will engage the lower surface of hook 36 while the lower surface portions of these sections form an obtuse angle. As relative swinging of such sections is continued, the engaged portions of hooks 17 and 36 will effect a wedging action which presses hook 17 inwardly, because hook 36 cannot move appreciably outwardly. The curved shape of tongue 15 and groove 33 will prevent disengagement of these joint elements under such circumstances. As the swinging movement continues, the shoulders of the hooks will pass as the flange 10 continues to be forced farther inward, and immediately following passage of the hook shoulders the resilience of flange 10 will snap hook 17 outward into engagement with hook 36, as shown in FIGURES 1 and 3. When the hooks are in this position the tongue 15 will fit in the groove 33, in the manner shown in FIGURES 1 and 4.

With the joint parts thus engaged, the hooks 17 and 36 cannot be expected to be disengaged inadvertently, and the tongue 15 and groove 33 cannot be disengaged as long as the hooks 17 and 36 are in latching engagement. The hooks 17 and 36 can be disengaged prior to final assembly by applying sufficient inward pressure on that portion of the flange 10 adjacent to the hook 36 to move the shoulder of hook 17 inward past the shoulder of hook 36. If the adjacent airfoil sections are swung relatively while the hook shoulders are in this position, in a direction opposite the hook-engaging direction of swing, the hook shoulders will be moved past each other, and the hooks will be disengaged. Continuation of such swinging movement will cause shoulder 16 of flange 11 to bear on rib 34 for effecting withdrawal of the tongue 15 from the groove 33 until the airfoil parts have been swung somewhat past the relationship shown in FIGURE 2, whereupon the airfoil sections can be moved freely apart.

The joint between the rearward portion of the intermediate section 3 and the forward portion of the trailing edge section 2 can be essentially of the same type as between the rearward portion of the leading edge section 1 and the forward portion of the intermediate section 3 described above. The flange 31 of the intermediate section corresponds to the flange 11 of the leading edge section, and a tongue 37 projects rearwardly from the rearward edge portion of this flange for engagement in a groove 24 formed in the lower portion of the trailing edge section 2. Such tongue is offset inwardly from the surface of the flange 31 to form a shoulder 38, and the groove 24 is formed between the lower rib 25 adjacent to the surface of the section and the inner rib 26 projecting forward from the rear spar 22. The upper surface of the tongue 37 is curved convexly and the upper surface of the groove 24 is complementally curved concavely. The lower surface of the tongue is curved concavely and the lower surface of the groove is complementally curved convexly.

The upper joint portion of the joint connecting the forward portion of the trailing edge section 2 and the rearward portion of the intermediate airfoil section 3 includes the interengageable hooks 39 and 27. The hook 39 is carried by the rearward edge portion of the intermediate section flange 30 offset inwardly from its exterior surface, and faces upwardly and outwardly corresponding to the hook 17 on the flange 10 of the leading edge section 1. The hook 27 corresponding to the hook 36 is formed on a short flange projecting forwardly from the rear spar 2 and located sufficiently close to the spar so that it will be maintained substantially fixed in definitely spaced relationship to the groove 24. This hook faces inwardly and downwardly and is spaced from the spar 22 sufficiently to receive the hook 39 between it and the spar.

The tongue 37 and groove 24 are engaged by relative swinging of the central airfoil section 3 and the trailing edge airfoil section 2, in the same manner as described for engaging the tongue 15 in the groove 33. The hook 39 is spaced sufficiently far from the main airfoil spar 32 so that the rearward edge of such flange and the rearward edge of flange 31 can be moved resiliently toward each other, at least to some extent. Consequently at the end of the upward relative swinging movement of airfoil sections 2 and 3 the surfaces of hooks 27 and 39 will be engaged with a wedging action which will depress the trailing portion of flange 30 sufficiently to enable the shoulders of the hooks to pass each other. Thereupon the resilience of the flanges 30 and 31 will cause the hook 39 to snap upward into locking engagement with hook 27, as illustrated in FIGURES 1 and 5. These hooks may be disengaged in the manner previously described with respect to hooks 17 and 36 by depressing the rearward portion of flange 30, and swinging the trailing edge section 2 and leading edge section 3 in the opposite direction from that in which they were moved to engage the hooks so that they will be pulled apart. Upon sufficient further swinging of these sections into the relationship shown in FIGURE 2 the tongue 37 will be withdrawn from the groove 24 sufficiently to enable the sections to be moved freely apart.

In FIGURES 7 and 8 the leading edge of airfoil section 1 is the same as that shown and described in connection with FIGURES 1, 2, 3 and 4, and the forward portion of the intermediate section 3' is the same as that of the section 3 shown in FIGURES 1 to 4 inclusive, and the same numbers have been applied to the corresponding parts. Consequently it is not necessary to describe these parts or their operation again. The difference in this modification resides in the structure of the rearward portion of the intermediate airfoil section 3' and in the construction of the trailing edge airfoil section 2'.

The type of connection between the rearward portion of the intermediate airfoil section 3' and the forward portion of the trailing edge airfoil section 2' is generally the same as the connection between the rearward portion of the leading edge section 1 and the forward portion of the intermediate section 3'. In this instance, however, the mounting of the rigidly spaced joint elements and of the resiliently spaced joint elements is simply reversed. The rigidly spaced joint elements are carried by the rearward portion of the intermediate section 3' adjacent to the rear spar 22', and the resiliently spaced joint elements are mounted on the forward portions of the forwardly projecting upper and lower flanges 20' and 21' of the trailing edge section 2'. The construction shown in FIGURES 7 and 8 is illustrated as being applied to an airfoil having a cross section substantially the same as that of FIGURE 1, but this type of construction is particularly well adapted for airfoils having different chord lengths. Thus the main spar 32 and the rear spar 22' forming with the upper and lower surface members 30' and 31' a box-beam spar could be closer together or farther apart.

The joint elements for connecting the rearward portion of the intermediate airfoil section 3' with the forward portion of the trailing edge airfoil section 2' include the tongue 28 spaced inward from the surface of the lower flange 21' of the trailing edge section 2', and projecting forwardly from its forward edge. The hook 29 is located inwardly from the outer surface of the upper flange 20' of the trailing edge section 2', and projects forwardly from its forward edge portion. The tongue 28 engages in the groove 4 above the rib 40 projecting aft from the lower portion of the intermediate section 3', and the hook 29 interlocks with the hook 41, projecting aft from the upper portion of the intermediate section. The tongue 28 is slid into the groove 4 by relative swinging of the airfoil sections 2' and 3', and the hooks 29 and 41 are engaged during such swinging, in the same manner as described for assembling the airfoil parts shown in FIGURES 1 and 2.

In order to mount the tongue 28 and hook 29 sufficiently resiliently to accomplish such operation, the upper and lower flange elements 20' and 21' of the trailing edge section in this instance are connected by the trailing edge members 23', and preferably are formed integrally with it. The groove 4 and the hook 41, on the other hand, are fixed in definitely spaced relationship by being located close to opposite edges of the rear spar 22'. The positive aerodynamic pressure beneath the airfoil sections 3' and 2' will tend to hold these sections in engagement, but they can be disconnected by pressing inward the forward portion of flange 20' to move hook 29 inwardly to clear hook 41. The two sections can first be moved relatively into the relationship shown in FIGURE 8, and the sections can then be moved freely apart. The trailing edge section 2' could be fabricated from separate pieces, like the trailing edge section 2 shown in FIGURES 1 and 2, but where the resiliently spaced joint elements are carried by the flanges 20' and 21' it is preferable for them to be of stiffer construction. Consequently it is preferred that the trailing edge section 2' be formed as an extruded part.

The construction shown in FIGURES 9, 10 and 11 is generally similar to the airfoils of FIGURES 1 to 6, and FIGURES 7 and 8, and corresponding parts have been numbered similarly. The construction of this airfoil is more similar to that shown in FIGURES 7 and 8 than to the airfoil of FIGURES 1 to 6, inclusive, in that the trailing edge section does not contain a spar. In fact, the airfoil of FIGURES 9 to 11, inclusive, may utilize precisely the same type of trailing edge section as provided for the airfoil of FIGURES 7 and 8. Also the leading edge section of the airfoil shown in FIGURES 9 to 11, inclusive, may have components corresponding precisely to the components of the leading edge sections, both of the airfoil shown in FIGURES 1 to 6 and of the airfoil shown in FIGURES 7 and 8. This airfoil section is shown as having small projections 42, against the inner ends of which a liner tube can bear to space the wall of such liner tube from direct contact with the wall of the leading edge airfoil section.

The principal difference between the airfoil construction shown in FIGURES 9 to 11, inclusive, and that shown in FIGURES 7 and 8 is that the central section has been narrowed so that the two spars 32 and 22' have been merged to form the single spar 32', from the upper portion of which the two hooks 36 and 41 project oppositely. Also the lower grooves 24 and 33 are closely adjacent to opposite sides of the spar 32'.

While the sections of the airfoil shown in FIGURES 9 to 11, inclusive, can be demounted prior to final assembly in the manner comparable to the technique by which the sections of the airfoils shown in FIGURES 1 to 6 and in FIGURES 7 and 8 can be demounted, it is intended that the sections of all the airfoils be secured together permanently by placing bonding or adhesive material in the joints between the hooks and between the tongues and grooves, as shown in the drawings. Even though the airfoils are designed so that the airfoil sections are resiliently secured together when assembled, and even though the aerodynamic forces on the airfoils tend to hold such sections in connected condition, it is still preferred that such sections be bonded together permanently, as described above, after they have been finally assembled.

I claim as my invention:

1. A sectional airfoil comprising two adjacent sections extending spanwise of the airfoil, and means connecting adjacent edges of said sections including a first joint portion adjacent to the lower surface of the airfoil having a tongue element with a convex inner surface and a concave outer surface and a complemental groove element having a concave inner surface and a convex outer surface interengageable by relative upward swinging of said adjacent sections, one of said elements being mounted on one of said airfoil sections and the other of said elements being mounted on the other of said airfoil sections, and a second joint portion spaced upwardly from said first joint portion and including two resiliently self-interlocking elements one carried by one of said airfoil sections and the other carried by the other of said airfoil sections.

2. A sectional airfoil comprising two sections extending spanwise of the airfoil and adjacent in fore and aft relationship, the rearward airfoil section including a spar extending spanwise of the airfoil and the forward airfoil section being of deep channel shape defining wide resilient upper and lower flanges extending rearwardly to free edge portions adjacent to said spar, and means connecting adjacent edges of said sections including a first joint portion adjacent to the lower surface of the airfoil having a tongue element and a groove element interengaged, said tongue element having a concave outer surface and said groove element having a complementally curved convex inner surface, said groove element being mounted on the rearward airfoil section and being located close to the forward side of said spar and said tongue element being mounted on the free edge portion of the lower flange of the forward airfoil section, and a second joint portion adjacent to the upper surface of the airfoil and including resiliently self-interlocking hook elements, one of said hook elements facing inward and being carried by the rearward airfoil section at a location close to the forward side of said spar, and the other of said hook elements facing outward and being carried by the free edge portion of the upper flange of the forward airfoil section to effect such self-interlocking engagement of said hook elements by inward yielding of said flanges.

3. A sectional airfold comprising two adjacent sections extending spanwise of the airfoil, and means connecting adjacent edges of said sections including a first joint portion adjacent to one surface of the airfoil having a tongue element and a groove element interengaged, one of said elements being mounted on one of said airfoil sections and the other of said elements being mounted on the other of said airfoil sections, and a second joint portion spaced from said first joint portion and including resiliently self-interlocking hook elements, one of said hook elements being carried by one of said airfoil sections and the other of said hook elements being mounted on the other of said airfoil sections yieldably relative to the first joint element mounted on the same airfoil section to enable the spacing therebetween to be altered resiliently sufficiently to effect such self-interlocking engagement of said hook elements.

4. A sectional airfoil comprising two adjacent sections extending spanwise of the airfoil, and means connecting adjacent edges of said sections including a first joint portion adjacent to one surface of the airfoil having a tongue element and a groove element interengaged, one of said elements being mounted on one of said airfoil sections and the other of said elements being mounted on the other of said airfoil sections, and a second joint portion spaced from said first joint portion and including resiliently self-interlocking hook elements, one of said hook elements facing inward, being carried by one of said airfoil sections adjacent to its surface and being fixedly spaced from said first joint portion and the other of said hook elements facing outward and being mounted on the other airfoil section spaced inwardly from its surface yieldably relative to the first joint element mounted on the same airfoil section to enable the spacing therebetween to be altered resiliently sufficiently to effect such self-interlocking engagement of said hook elements.

5. A sectional airfoil comprising two adjacent sections extending spanwise of the airfoil, one of said sections including a flange of extent chordwise of the airfoil greater than the average thickness of such airfoil section and having a free edge portion adjacent to the other airfoil section, and means connecting adjacent edges of said sections including a first joint portion adjacent to one surface of the airfoil having a tongue element and a groove element interengaged, one of said elements being mounted on one of said airfoil sections and the other of said elements being mounted on the other of said airfoil sections, and a second joint portion spaced from said first joint portion and including resiliently self-interlocking hook elements, one of said hook elements being carried by one of said airfoil sections and being fixedly spaced from said first joint portion and the other of said hook elements being carried by the free edge portion of said flange of the other airfoil section and thereby being yieldably movable relative to the first joint element mounted on the same airfoil section to enable the spacing therebetween to be altered resiliently sufficiently to effect such self-interlocking engagement of said hook elements.

6. A sectional airfoil comprising two adjacent sections extending spanwise of the airfoil, and means connecting adjacent edges of said sections including a first joint portion adjacent to one surface of the airfoil having a tongue element and a groove element interengaged, one of said elements being mounted on one of said airfoil sections and the other of said elements being mounted on the other of said airfoil sections, and a second joint portion spaced from said first joint portion and including resiliently self-interlocking hook elements, one of said airfoil sections including a spar extending spanwise of the airfoil and carrying one of said hook elements adjacent to said spar fixedly spaced from said first joint portion, and the other of said airfoil sections including a cantilever flange extending toward said spar and having an edge portion carrying the other of said hook elements of a width a minor portion of the width of said flange chordwise of the airfoil, and said flange being resiliently yieldable relative to said spar transversely of the airfoil sufficiently to enable movement of such other hook element relative to said first hook element to effect such self-interlocking engagement of said hook elements.

7. A sectional airfoil comprising two adjacent sections extending spanwise of the airfoil including a first section of deep channel shape defining spaced wide resilient cantilever flanges and a second section having a spar adjacent to said section of generally channel shape, said first section having spaced flanges extending chordwise of the airfoil toward said spar with free edge portions resiliently variable in spacing disposed adjacent to said spar, and means connecting adjacent edges of said sections including first joint elements spaced transversely of the airfoil and carried by said second section adjacent to said spar, and complemental joint elements carried respectively by the free edge portions of said flanges, of a width a minor portion of the width of said flanges chordwise of the airfoil and connectable to said first joint elements by snap engagement effected by resilient variation in the spacing of said free edge portions of said spaced flanges.

8. The sectional airfoil defined in claim 7, in which the deep channel-shaped section is a leading edge section, and its flanges extend rearwardly to the free edge portions.

9. The sectional airfoil defined in claim 7, in which the deep channel-shaped section is a trailing edge section and the flanges extend forwardly to the free edge portions.

10. The sectional airfoil defined in claim 7, in which the airfoil includes a leading edge section, a trailing edge section and an intermediate section, and the intermediate section is of deep channel shape and has upper and lower flanges extending rearwardly in cantilever fashion to free edge portions adjacent to the trailing edge section.

11. A sectional airfoil comprising two adjacent sections extending spanwise of the airfoil, one of said airfoil sections being of deep channel shape defining spaced wide resilient upper and lower cantilever flanges extending chordwise of the airfoil to free edge portions and the other airfoil section including a spar extending spanwise of the airfoil adjacent to said free edge portions of said flanges, and means connecting adjacent edges of said sections including a first joint portion adjacent to one surface of the airfoil having a tongue element and a groove element interengaged, said tongue element having a concave outer surface and said groove element having a complementally curved convex inner surface, one of said elements being mounted on the airfoil section including said spar and being located close to said spar and the other of said elements being mounted on the free edge portion of an adjacent flange of the other airfoil section, and a second joint portion spaced from said first joint portion and including resiliently self-interlocking hook elements, one of said hook elements facing inward and being carried by the airfoil section having said spar at a location close to said spar, and the other of said hook elements facing outward and being mounted on the free edge portion of the other flange of the other airfoil section to effect such self-interlocking engagement of said hook elements by inward yielding of said flanges.

12. A sectional airfoil comprising two airfoil sections having joint elements extending spanwise of the airfoil, interengageable to connect said sections by relative swinging of said sections to increase the downwardly facing obtuse angle formed between the adjacent lower surfaces of said sections, and including two resiliently self-interlocking elements one carried by one of said airfoil sections and the other carried by the other of said airfoil sections.

References Cited in the file of this patent

UNITED STATES PATENTS

| | | |
|---|---|---|
| 2,362,804 | Cox | Nov. 14, 1944 |

FOREIGN PATENTS

| | | |
|---|---|---|
| 212,993 | Great Britain | Mar. 21, 1924 |
| 272,231 | Great Britain | Nov. 3, 1927 |